United States Patent [19]
Dannoux

[11] Patent Number: 5,091,989
[45] Date of Patent: Feb. 25, 1992

[54] METHOD FOR ENCAPSULATING AN OPTICAL COMPONENT AND THE ENCAPSULATED COMPONENT OBTAINED THEREBY

[75] Inventor: Thierry L. A. Dannoux, Avon, France

[73] Assignee: Corning Incorporated, Corning, N.Y.

[21] Appl. No.: 593,903

[22] Filed: Oct. 5, 1990

[30] Foreign Application Priority Data

Oct. 9, 1989 [FR] France .................. 89 13136

[51] Int. Cl.[5] .............................. G02B 6/36
[52] U.S. Cl. ..................................... 385/70
[58] Field of Search ............ 350/96.1, 96.2–96.22

[56] References Cited

U.S. PATENT DOCUMENTS

| | | | |
|---|---|---|---|
| 4,220,397 | 9/1980 | Benasutti | 350/96.2 |
| 4,707,069 | 11/1987 | Hoffman, III | 350/96.21 |
| 4,717,233 | 1/1988 | Szkaradnik | 350/96.21 |
| 4,818,058 | 4/1989 | Bonanni | 350/96.21 X |
| 4,948,224 | 8/1990 | Modrey | 350/96.21 |

Primary Examiner—Akm Ullah
Attorney, Agent, or Firm—K. McNeill Taylor, Jr.

[57] ABSTRACT

A process for encapsulating a component for interconnecting optical fibers wherein a bar connected to the fibers is inserted and sealed with a sealing composition into an elongated housing with U-shaped cross-section, and an encapsulated component manufactured by this process, wherein the regions of the junctions between the fibers and the bar are protected from the flow of the sealing composition.

9 Claims, 1 Drawing Sheet

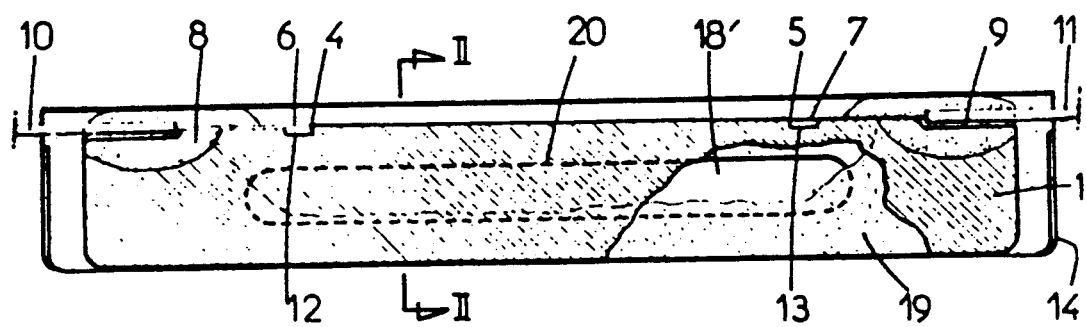
FIG.:1
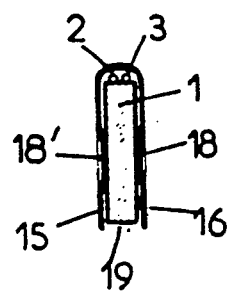
FIG.:2
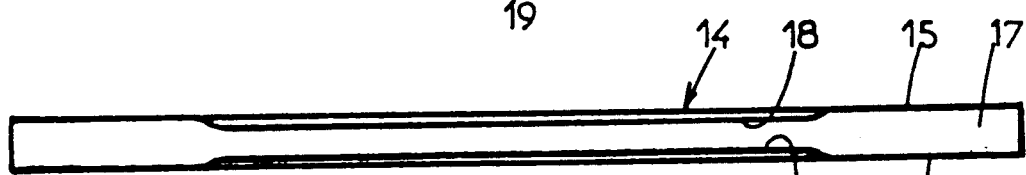
FIG.:3
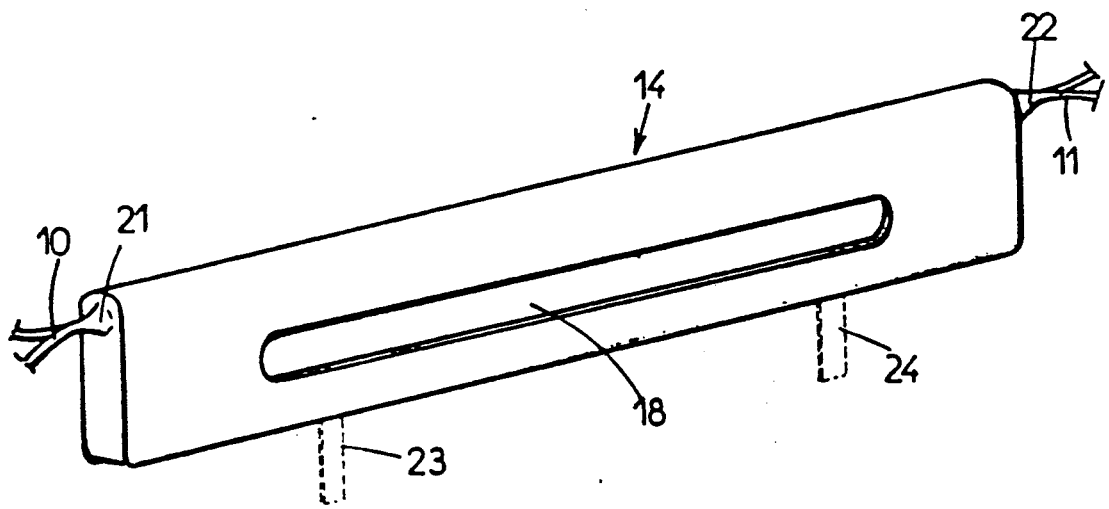
FIG.:4

METHOD FOR ENCAPSULATING AN OPTICAL COMPONENT AND THE ENCAPSULATED COMPONENT OBTAINED THEREBY

BACKGROUND OF THE INVENTION

The present invention relates to a process for encapsulating an optical component for the interconnection of optical fibers, and to an encapsulated component obtained by the application of this process. More particularly, but not exclusively, the invention concerns a process for encapsulating an integrated optical component.

The optical components for interconnecting optical fibers, such as couplers or multiplexers, both singlemode and multimode, include small, fragile, glass pieces. This is particularly true of integrated optical components such as the one described in Dannoux et al. U.S. Pat. No. 4,943,130, which is directed to very small components. To protect these components, whether integrated or not, several means have been proposed which assure mechanical protection of the component and/or protection against injuries of a chemical, optic, thermal or any other sort which may be present in the environment in which these components are used.

European Patent No. 106,116 is directed to a protective arrangement for an optical fiber coupler. The arrangement includes a support element in the form of a V-shaped trough in sections to which the coupler is attached at adhesive points It also includes a tubular screen surrounding the support element, and joints which establish airtight closing of the extremities of the tubular screen. Protection can be further reinforced by the installation of this arrangement in a housing loaded with an additional filling material. This patent also describes an additional support element which is placed between the coupler itself and the first support element.

The result is a rather complex structure which requires the assembly of a number of pieces. The space enclosed by the structure is much greater than the dimensions of the protected coupler.

There is further described in this European patent a process for manufacturing this structure which consists of placing the coupler in the open channel of the V-shaped trough support element, attaching it with an adhesive to the support element in said open channel, surrounding the support element with a tubular screen made of a retractable material, retracting the screen around the support element in order to form a sub-assembly, inserting the sub-assembly within the vacant space in a receiving channel within a housing, sealing the open ends of the tubular screen around the coupler with the aid of joints whose dimensions define a receiving space between the screen and the housing, filling the receiving space with a material capable of hardening with the sub-assembly immersed therein, and causing the material which is capable of hardening to do so.

This manufacturing process contains a great number of stages which render it rather expensive. In particular, one stage of this procedure consists of sliding the tubular screen on the support element, an operation which requires a previous threading of the screen on one or more of the interconnected fibers, followed by a floating of the screen on the support element, operations which are very inconvenient.

Accordingly, it is an object of the present invention to provide an encapsulation process for an optical component, and an optical component obtained by this process which do not present the difficulties cited above.

In particular, one object of the invention is an encapsulation process for interconnected optical fibers which is simple, rapid and therefore relatively inexpensive.

Another object of the invention is the location of a protective structure upon the component without a prior threading of the protective structure on one or more optical fibers, even though the protective structure is already connected to the fibers which it interconnects.

Yet another object of the present invention is an encapsulated component for optical interconnection with significantly reduced enclosed space, scarcely greater than that of the bare component.

A further object of the present invention is an encapsulated component which can be handled without risk of deterioration, the component being well protected against various mechanical, chemical or other incursions and, in particular, against humidity.

Another object of the present invention is the encapsulation of a component manufactured by integrated optics technology.

SUMMARY OF THE INVENTION

These and other objects are achieved in connection with the present invention which includes a process for encapsulating an optical component for interconnecting optical fibers which includes a bar connected to these fibers, wherein the bar is inserted along a direction perpendicular to the longitudinal axis of the fibers into an elongated casing which is U-shaped in transverse cross-section. The internal width of the U is substantially the same as the thickness of the bar. A sealing composition is applied to the casing in the open contour of the U in a manner which fixes the bar within the casing.

This process is applied to the encapsulation of a component for interconnecting optical fibers, said component comprising a monolithic glass bar with at least one optical circuit path formed thereon, and wherein at least one optical fiber is connected to at least one circuit path end. The process includes the insertion of the glass bar in a casing with side walls placed in such a manner as to prevent the flow, through capillary action, of the sealer into the regions of the junctions between the fibers and the bar.

According to another embodiment of the invention, a resin which can be hardened thermally is used as the sealing composition.

According to yet another embodiment of the invention, the sealing composition comprises a soldering compound which is deposited by wave-soldering.

One advantage of the encapsulation process of the present invention is the simplified installation of the bar within the U-shaped casing by movement perpendicular to the longitudinal axis of the bar. In this way, the casing does not need to be moved axially along the one or more optical fibers before being pushed back along the bar connected to these fibers.

The encapsulated component obtained by the application of the inventive process includes a U-shaped casing whose internal width is substantially the same as the thickness of the bar. The casing has the appropriate length and height to assure protection of the bar, and a sealing composition is spread into the open contour of the casing adjacent the opposing surfaces of the bar to secure the bar in the casing and seal the casing.

Where the encapsulated component is an integrated optical component for interconnecting optical fibers, including a monolithic glass bar on a part of which is formed at least one optical circuit path and optical fibers connected to the ends of the path, means are provided for impeding the flow of the sealing composition into the regions of the junctions between the fibers and the bar.

In one embodiment of the inventive process, these means comprise oblong depressions formed in the side walls of the casing parallel to its longitudinal axis and depressed toward its interior. These depressions protect the regions where the fibers are joined to the bar against a capillary flow of the sealing composition.

The arrangement is advantageous in that it effectively protects these junctions, which are fragile, against the mechanical action which may result from the differential thermal expansion of the glass of the bar and the sealing composition.

Other features and advantages of the present invention will be apparent from the detailed description and the FIGs. described therein.

BRIEF DESCRIPTION OF THE DRAWINGS

FIG. 1 is a longitudinal cross-section view, with partial cut-away, of the component for the interconnection of optical fibers encapsulated according to the present invention.

FIG. 2 is a cross-section view of the encapsulated component of the present invention, taken along II—II in FIG. 1.

FIG. 3 is a view from below of a casing which forms a part of the encapsulated component represented in FIGS. 1 and 2.

FIG. 4 is a perspective view of the encapsulated component after the process of the invention has been carried out.

DETAILED DESCRIPTION OF THE INVENTION

The attached drawings depict a component 1 for the interconnection of optical fibers. This component may be, for example, a coupler or a multiplexer, either singlemode or multimode, and it may be of a conventional design or fabricated by integrated optics technology. Such integrated optics components are described in Dannoux U.S. Pat. No. 4,943,130 which is referred to above.

In FIGS. 1 and 2 is depicted an integrated optical component formed on a monolithic bar of glass of rectangular cross-section. Near the upper surface of the bar (as depicted in FIGS. 1 and 2), are optical circuit paths 2 and 3 which are formed, for example, by ion exchange. Each path contains the same constituents as the glass of the bar as well as ions which raise the index of refraction of the path to a value which exceeds that of the glass of the bar. Each path runs near the upper surface of the bar, between junction zones 4 and 5 where the ends of the paths are connected with optical fiber 6 and 7 respectively. Two drops, 8 and 9 of a polymerizable resin, for example ensure the mechanical connection of fibers 6 and 7 with bar 1. Fiber 6 and 7 are covered by sheaths 10 and 11.

In one embodiment, consistent with the component and method described in Dannoux U.S. Pat. No. 4,943,130, which is referred to above, transverse exit grooves (12, 13) are made in the bar in the vicinity of junctions 4 and 5 of fibers 6 and 7 with bar 1. This allows for the utilization of a micro-manipulator for precise placement of the fibers respect to the optical path to which they are connected. A drop of an adhesive such as acrylic glue may be used to ensure precise and stable attachment of the fibers at the ends of the optical paths, at junctions 4 and 5.

Such a component thus assures the transmission of optical information between one or more input fibers (e.g., fiber 6) and one or more output fibers (e.g., fiber 7), in numerous transmission forms, for example the coupling of the information transmitted by two fibers or the multiplexing of information transmitted by several fibers. The forms of transmission are well known to those skilled in the art and will not be further described.

The unencapsulated component described so far is unprotected, that is to say, fragile, and is inappropriate for handling in practical use. Typically, bar 1 has a length on the order of tens of millimeters, a height on the order of millimeters and a thickness on the order of one millimeter.

To protect the optical interconnection component from deteriorated performance during practical handling within optical fiber networks, enclosures have been conceived whose occupied space limits considerably the density of the components which may be fixed on a single component board. As a primary example, it is clear that the protective structure described in European patent 106,116, which is referred to above, substantially increases the enclosed space of the protected component.

The present invention eliminates this difficulty by providing an optical interconnection component which is effectively protected without substantially increasing its enclosed space.

Accordingly, bar 1 is protected with an elongated casing 14 which has a U-shaped cross-section perpendicular to its longitudinal axis, and whose inner geometry is adapted for receiving the bar, as is depicted in FIGS. 1 and 2. Casing 14 includes side walls 15 and 16 (FIG. 3) united by connection piece 17. As depicted in FIG. 2, side walls 15 and 16 are adapted to cover and be attached to the opposing surfaces of bar 1. The height and length of each side wall are slightly larger than the corresponding dimensions of the opposing surfaces of the bar which they cover and are affixed to.

As an essential feature of the present invention, the significance of which is explained below, two oblong depressions 18 and 18' are formed in side walls 15 and 16 respectively, parallel to the longitudinal axis of the casing. These depressions are sunk toward the interior of the casing to a distance such that the separation between depressions 18 and 18' is sufficient to receive bar 1, as FIG. 2 depicts.

Thus, according to the encapsulation process of the present invention, bar 1 is inserted into casing 14 in such a way that bar 1 occupies the position within casing 14 that is illustrated in FIG. 1. In this position, the oblong depressions 18 and 18' formed in side walls 15 and 16 respectively lightly impinge upon the opposing surfaces of bar 1. The depressions extend axially beyond junctions 4, 5 between the fibers and bar 1. This feature is important for the protection of junctions 4, 5 as will be explained below.

According to this design, the insertion of bar 14 into casing 1 can be accomplished by sliding bar 1 into casing 14 in a direction perpendicular to the longitudinal axis of bar 1, by virtue of the U-shaped cross-section of casing 14. Thus, according to the present invention, the casing is placed over the bar without threading it over the one or more optical fibers and then sliding it over the bar. This is in sharp distinction to the tedious and inconvenient technique used in the prior art in which a sheath of closed transverse cross-section is utilized to protect the bar.

Having thus placed bar 1 in casing 14, the process of encapsulation is carried out. A sealing composition is deposited upon the open circumference of the casing, between side walls 15 and 16. The sealing compound provides a hermetic seal which is necessary to protect the active part of the optical component (along optical paths 2 and 3 and the junctions 4 and 5 between these paths and optical fibers 4 and 5) against all external invasion by fluids, gas or liquids which could penetrate the casing and reach this active part.

The sealing composition, which is deposited in the fluid state, fills the free space in region 19 shaded in FIG. 1. More particularly, it fills the free space between each side wall of casing 14 and the opposing surface of bar 1 in the vicinity of the edge of the side wall. Thereafter the sealing composition rises through capillary action into the casing between the opposing surface of the bar and the adjacent depression. However, according to an important aspect of the present invention, the sealing composition will not then rise beyond far edge 20 of the depression (FIG. 1), because the space separating the casing from the opposing surface of the bar increases abruptly and therefore the capillary action is lost with equal suddenness. Therefore, because depressions 18 and 18' establish a guard around junctions 4 and 5, these junctions are protected from contact with the sealing composition.

Such a sealing compound may comprise, for example, a resin capable of hardening such as the epoxy resin denoted AV144-2 in the catalogs of Ciba-Geigy. The sealing composition is deposited in the fluid state by well-known deposition means, such as induction rollers or syringes. The composition is then hardened, for example, by placement in an oven.

In a preferred embodiment of the invention, a vent hole may be added to one side wall 15 of the U-shaped casing 14 in a region of the casing which communicates with the interior region not contacted by the sealing composition. This serves as a relief mechanism for the gas inside the casing during application of the sealing composition and thereafter during hardening. The component may be dehydrated in an oven after hardening, and then the vent hole may be sealed with an epoxy such as is used as the sealing composition.

According to an alternative embodiment of the invention, a sealing composition of solder may be deposited by the technique called "wave-soldering", which is well known in the manufacture of electronic component boards. In such case, casing 14 is metallic. As the casing must form a solid body with the encapsulated product, it is advantageously constructed with a metal which provides thermal expansion characteristics equivalent to those of the glass which forms bar 1. To this effect, the casing may be formed from an iron-cobalt-nickel alloy which is sold under the name DILVER by Imphy, S.A. Of course, other metal alloys which have a very low coefficient of thermal expansion may be used, for example, the alloy sold under the name INVAR.

When a metal is used, the side wall 15 of the casing must be very thin, typically on the order of 1 or 2 tenths of a millimeter. Even if the side wall is made of a material with thermal coefficient of expansion similar to that of the glass of the bar, the kinetics of expansion may be different. In the event of thermal shock, the casing must be able to "follow" the bar and thus present only a weak resistance to the tension or compression effects which may be applied by the bar. In a normal environment, the casing mechanically reinforces the bar by means of a standard "skin" effect analogous to that which occurs where a metallic piece is applied to a surface, and the casing increases the resistance of the bar to bending.

FIG. 4 depicts the encapsulated optical component in the final state. In is apparent that the exits 21, 22 for optical fibers 10, 11 are plugged to seal the component and limit the radius of curvature of the fibers at these exits to a predetermined value. As a plugging means, one utilizes an elastic composition which limits the curvature of the fibers at these exits below a predetermined value, in order to minimize the optical losses in the fibers or to avoid their mechanical deterioration.

Also depicted in FIG. 4 in phantom are tabs 23, 24 which extend perpendicularly from the lower edge of at least one side wall of casing 14. These optional tabs permit the attachment of the component to a component board, by insertion of the tabs in holes in the board. The tabs are attached in turn to the reverse side of the board by wave-soldering.

Thus, optical component boards analogous to electronic component boards may be constructed, such boards assuming the extraordinary compactness of the encapsulated component of the present invention.

The encapsulated component depicted in FIG. 4 may be further sealed with a protective covering which is molded around casing 14 to increase its resistance to environment attack. Casing 14 can also be reinforced by placement within a housing with a protective covering or not, as long as harsh environmental conditions require such a precaution.

However, the encapsulated component in accordance with the present invention is intended to be handled without special precautions in a normal environment, even though it is neither wrapped with a protective covering or protected by a housing.

Thus the present invention provides a sure encapsulation process, both rapid and inexpensive, for an optical interconnection component, wherein the encapsulated component is almost as compact as the bare component, thus enabling the high density mounting of components.

It is to be understood that the invention is not limited to the specific method of manufacture or other details recited herein, which are given here as an example. The invention extends to the encapsulation of all components for interconnecting optical fiber, whether or not carried out in integrated optics technology. Accordingly, the invention is to be limited only by the scope of the appended claims.

I claim:

1. An encapsulated component for the interconnection of optical fibers comprising:
    a bar having two parallel faces, and two edges which each have an area substantially smaller than the area of each of said faces, said optical fibers being disposed along one of said edges;
    a U-shaped casing substantially surrounding said bar and said one edge, the internal width of said casing being substantially the same as the thickness of said bar between said parallel faces, said U-shaped casing having side walls whose length and height are such that the side walls of said casing substantially overlap said bar; and a sealing composition in the open contour of said casing, adjacent the opposing surfaces of said bar, to secure said bar in said casing and seal said casing.

2. The encapsulated component of claim 1, wherein said bar includes at least one optical circuit path formed thereon with at least one optical fiber connected to at least one path end, and further comprising means for preventing the flow of the sealing composition into the region of the junction between said fiber and the bar.

3. The encapsulated component of claim 2, wherein said means for preventing the flow of the sealing composition comprise oblong depressions formed in the side walls of the U-shaped casing parallel to its longitudinal axis.

4. The encapsulated component of claim 3, wherein said at least one optical circuit path comprises an integrated optical circuit for interconnecting optical fibers.

5. The encapsulated component of claim 1, wherein said sealing composition comprises a resin which can be thermally hardened.

6. The encapsulated component of claim 1, wherein said U-shaped casing is metallic and said sealing composition comprises a soldering compound.

7. The encapsulated component of claim 1, further comprising plugging means for at least one region where the fibers exit the component to seal the component and limit the radius of curvature of the fibers at these exits to a predetermined value.

8. The encapsulated component of claim 1, further comprising tabs which extend perpendicularly from the lower edge of at least one side wall of the U-shaped casing for use in attaching the component to a component board, by insertion of the tabs into holes in the board.

9. The encapsulated component of claim 1, further comprising sealed vent means in said U-shaped casing.

* * * * *